US011379950B1

(12) United States Patent
Hamilton et al.

(10) Patent No.: US 11,379,950 B1
(45) Date of Patent: Jul. 5, 2022

(54) SYSTEM AND METHOD FOR PROJECTING CONTENT IN AN ENVIRONMENT

(71) Applicant: Lemon Inc., Grand Cayman (KY)

(72) Inventors: Frank Hamilton, Los Angeles, CA (US); Hwankyoo Shawn Kim, Culver City, CA (US); Zhixiong Lu, Beijing (CN); Qingyang Lv, Beijing (CN); WeiShan Yu, Culver City, CA (US); Ben Ma, Beijing (CN)

(73) Assignee: LEMON INC., Grand Cayman (KY)

( * ) Notice: Subject to any disclaimer, the term of this patent is extended or adjusted under 35 U.S.C. 154(b) by 0 days.

(21) Appl. No.: 17/315,257

(22) Filed: May 7, 2021

(51) Int. Cl.
*G06T 3/00* (2006.01)
*G06T 7/194* (2017.01)
*G06T 19/00* (2011.01)
*G06T 7/536* (2017.01)

(52) U.S. Cl.
CPC ............ *G06T 3/0093* (2013.01); *G06T 3/005* (2013.01); *G06T 7/194* (2017.01); *G06T 7/536* (2017.01); *G06T 19/006* (2013.01)

(58) Field of Classification Search
CPC ....... G06T 3/0093; G06T 3/005; G06T 7/194; G06T 7/536; G06T 19/006
See application file for complete search history.

(56) References Cited

U.S. PATENT DOCUMENTS

2020/0105006 A1* 4/2020 Karsch ................. G06V 10/255
2021/0383616 A1* 12/2021 Rong ....................... G06N 3/04

* cited by examiner

*Primary Examiner* — Jeffery A Brier

(57) ABSTRACT

Systems and methods directed to placing content are described. More specifically, content is received and depth information corresponding to an external environment of the computing device is obtained. An indication to associate the content with a location based on the depth information is received from a user. Information for at least one plane associated with the depth information at the location is obtained and at least a portion of the content is warped to match the at least one plane based on the depth information.

20 Claims, 14 Drawing Sheets

| Object_ID | Coordinate | Depth Map |
|---|---|---|
| C_1 | $X_1, Y_1, Z_1$ | E4AC1 |
| C_2 | $X_2, Y_2, Z_2$ | BA8C4 |

| Object_ID | Content |
|---|---|
| C_1 | Video_1V1 |
| C_2 | Video_1V2 |
| C_3 | Video_1V2 |
| Car_1 | Video_2 |
| IMG1 | Image_1 |

SYSTEM AND METHOD FOR PROJECTING CONTENT IN AN ENVIRONMENT

BACKGROUND

Augmented reality provides many opportunities to develop engagement content and effects for users, particularly for users of smartphone devices. In examples, translation services, design visualization services, and other information services can provide a user with information that is otherwise not readily available or otherwise would require substantial effort by the user to obtain. For example, a user desiring to view a menu in a foreign language can readily download and use a language translation application to translate the menu in real-time. Further, a user may place a two-dimensional image of a chair for example, into an image of a room to visualize what the chair would look like in their room without physically acquiring the chair. In addition, entertainment applications have similarly included augmented reality as a means to increase user experiences and/or overall use of an application.

It is with respect to these and other general considerations that embodiments have been described. Although relatively specific problems have been discussed, it should be understood that the examples described herein should not be limited to solving the specific problems identified in the background above.

SUMMARY

In accordance with examples of the present disclosure, systems and methods directed to placing content into a world of a user as imaged by an imaging device of a computing device are described. More specifically, content accessible by a computing device is received and depth information corresponding to an external environment of the computing device is obtained. An indication to associate the provided content with a location based on the depth information is received from a user. Information for at least one plane associated with the depth image at the location is obtained; and at least a portion of the content is warped to match the at least one plane based on the depth information.

In accordance with examples of the present disclosure, a method for placing content into an imaged environment that is external to a computing device is described. The method may include receiving content, obtaining depth information corresponding to the imaged environment external to the computing device, receiving an indication to associate the content with a location in the imaged environment based on the depth information, and warping at least a portion of the content based on the depth information corresponding to the imaged environment external to the computing device.

In accordance with examples of the present disclosure, a system configured to place content into an imaged environment that is external to a computing device is described. The system may include a processor, and memory including instructions, which when executed by the processor, causes the processor to: receive content, obtain depth information corresponding to the imaged environment external to the computing device, receive an indication to associate the content with a location in the imaged environment based on the depth information, and warp at least a portion of the content based on the depth information corresponding to the imaged environment external to the computing device.

In accordance with examples of the present disclosure, a computer-readable storage medium is described. The computer-readable storage medium may include instructions, which when executed by a processor, cause the processor to: receive content, obtain depth information corresponding to an imaged environment that is external to a computing device, receive an indication to associate the selected content with a location in the imaged environment based on the depth information, and warp at least a portion of the content based on the depth information corresponding to the imaged environment external to the computing device.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Figure 1:
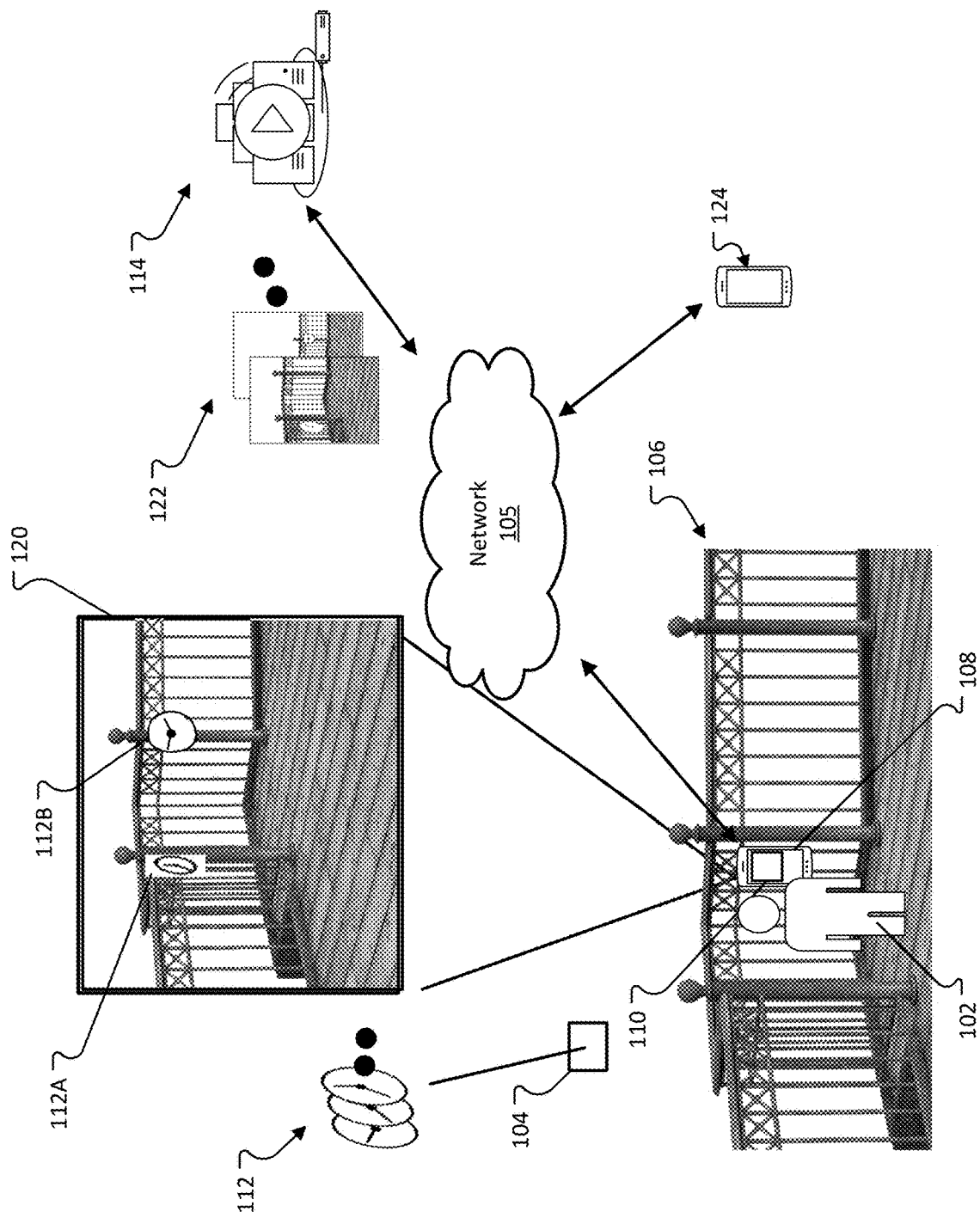
FIG. 1 depicts an example system providing the ability for a user to place content, such as content, into the user's environment or world as viewed through an augmented reality user interface in accordance with examples of the present disclosure.

FIG. 1 depicts an example system 100 providing the ability for a user 102 to place content 104, such as content 112, into the user's environment or world 106 as viewed through an augmented reality user interface in accordance with examples of the present disclosure. Content 104 may include, but not limited to text, audio, one or more images, one or more animations, and one or more videos. The augmented reality user interface or display may be generated by an application 110 residing on or otherwise at least partially executing at a computing device 108. In examples, a user 102 may desire to place content 104 into their world as captured by the computing device 108. In another example, the content 104 may be the content provided by the application 110, and accordingly, the user 102 may select the desired content 104 to place such content into their world as a preset for example, by the application 110 installed in the computing device 108. In another embodiment, the content 104 may also be the content captured by the computing device 108 in real-time. For example, the user 102 may desire to upload, select, or capture content 112 into their environment as captured and made viewable by the computing device 108. The user 102 may upload, select, or capture the content 112 and place the content 112 as depicted in the example user interface 120.

The first content 112A is placed at a location in a manner such that the first content 112A appears to be part of the environment or world 106. Accordingly, when the user moves the computing device 108 such that the first content 112A is no longer visible in a user interface of the computing device 108, the first content 112A becomes visible when the user returns to the location where the first content 112A was placed. Further, the first content 112A, appearing to be placed within the environment or world 106, may be visible from different angles or locations within the environment or world 106. For example, when the user moves the computing device 108, the images or video acquired by the application 110 may show the first content 112A from an angle other than the angle when the first content 112A was placed in the environment or world 106. As another example, when the user moves the computing device 108, the images or video acquired by the application 110 may show the first content 112A from a location other than at the location of the computing device 108 when the first content 112A was placed in the environment or world 106.

In addition, the content 104 may appear to be projected onto a surface of the environment or world 106. For example, the first content 112A appears to be projected onto the railing surface depicted in the user interface 120. In some instance, the content 104 may be placed on two or more surfaces, or planes. Accordingly, and is illustrated in FIG. 1, the content 104 may be placed on two surfaces or planes. More specifically, and as depicted in FIG. 1, the second content 112B which corresponds to the content 104 may be placed to look as if it is projected onto a corner. The second content 112B can be a copy of the first content 112A. The second content 112B can be a different image or video from the first content 112A. Stated differently, at least a portion of the second content 112B appears to be placed on a surface that is different from a surface on which another different portion of the second content 112B is placed when viewed by an image or video acquired by the user interface provided by the application 110. In examples, once the content 104, such as the content 112 is placed, a user may record their interaction with the placed content.

The user 102 may obtain depth information associated with the environment or world 106 and then place, or otherwise attach the content 112 to a location within the environment or world, where such location is based on the obtained depth information. For example, depth information may be obtained based on a plurality of sensors, such as LiDAR, Structure Light, or other sensors. In one embodiment, the depth information can be obtained based on multiple images of the environment or world 106 that are acquired by an image sensor of the computing device 108. The depth information may exist as a depth map and provide distance information for objects, surfaces, or the like that are within the environment or world 106 of the user 102 and for which an image of such has been acquired by an image sensor of the computing device 108. Once user has determined a location to place the content 112, the user may place additional content 112 and/or start to capture video or images of the user's environment or world 106 that includes the placed content 112. The captured video of the user's environment or world 106 together with the placed content 112 may then be provided to the video hosting platform(s) 114 as video frames 122 via the networked environment 105. In examples, another computing device 124 may access the video frames 122 and for viewing. The networked environment 105 may be a radio access network, such as LTE or 5G, a local area network (LAN), a wide area network (WAN) such as the Internet, or wireless LAN (WLAN), for example. It will be appreciated that this is not intended to be limiting, and that the scope of this disclosure includes implementations in which the computing device 108 and/or 124 and video hosting platform(s) 114 may be operatively linked via some other communication coupling. The computing device 108 and/or 124 may be configured to communicate with the networked environment 105 via wireless or wired connections. In addition, in an example, the computing device 108 and/or 124 may be configured to communicate directly with each other via wireless or wired connections.

Figure 2A:
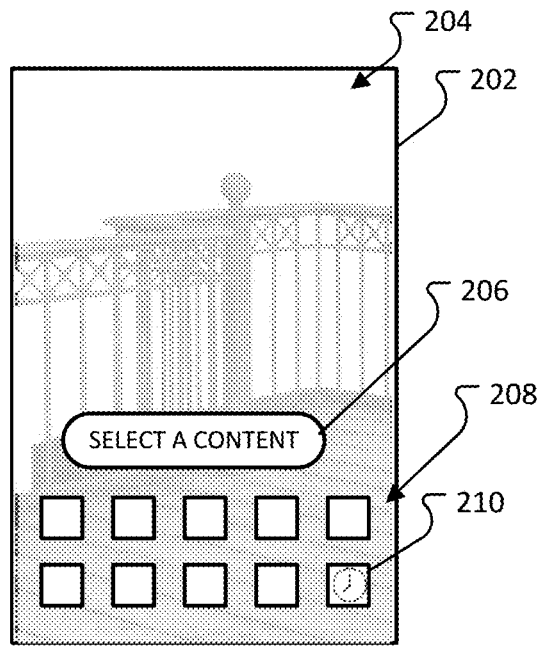
FIGS. 2A-2G depict example user interfaces for placing content in accordance with examples of the present disclosure.

FIGS. 2A-2G depict example user interfaces 202 for placing content in accordance with examples of the present disclosure. As depicted in FIG. 2A, a user interface 202 displayed at a computing device, such as the computing device 108 (FIG. 1) may depict a first image 204 as imaged by an image sensor of the computing device 108. A first user control 206 may prompt a user to select content, such as a video or an image. In examples, icons associated with content accessible by the computing device may be displayed as icons 208. In examples, the icons may depict one or more scenes of a respectively displayed video or an image. A user may select an icon 210 associated with a desired video or image to be included in the user's environment or world as viewed from an image sensor of the computing device.

FIG. 2A is just an illustrative example. In other examples, the user interface 202 displayed at a computing device, such as the computing device 108 (FIG. 1) may depict a first image 204 as imaged by an image sensor of the computing device 108. Another icon (not shown in FIG. 2A) may prompt a user to capture content, such as a video or an image. Accordingly, the captured video or image can be included in the user's environment or world as viewed from an image sensor of the computing device.

Figure 2B:
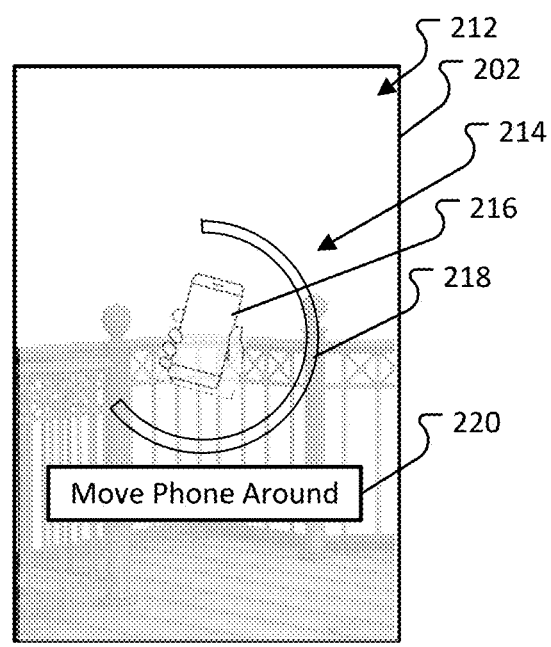
Figure 2C:
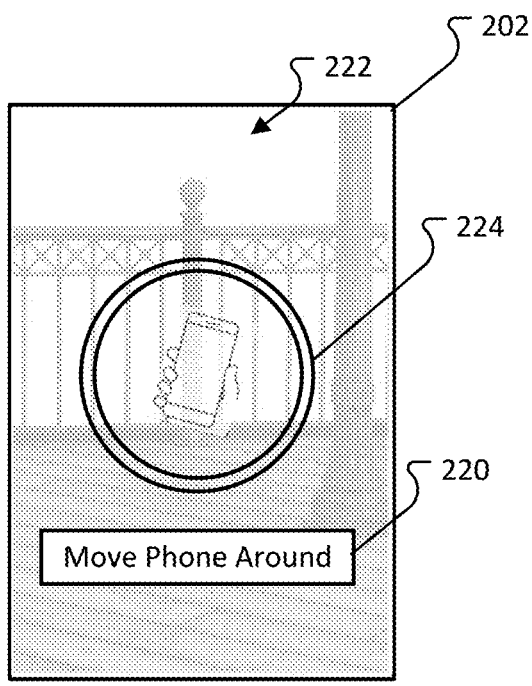

As depicted in FIG. 2B, the user interface 202 displayed at the computing device, such as the computing device 108 (FIG. 1) may depict a second image 212 as imaged by an image sensor of the computing device. The second image 212 may be of the same scene as the first image 204 but from a different viewpoint. The user interface 202 may indicate a user to move the computing device around to acquire depth information, i.e., via displaying a prompt 214 on the user interface. For example, a prompt 214 may be displayed at the display of the computing device. The prompt 214 may include an image 216 depicting a hand holding a phone, a ring 218 indicating a status of the depth information collection, and text 220 stating a user action. The prompt 214 is for illustrative purpose, and other types of prompts can be also used; the present disclosure is not limited to any specific prompt. As depicted in FIG. 2C, the user interface 202 displayed at the computing device, such as the computing device 108 (FIG. 1) may depict a third image 222 as imaged by an image sensor of the computing device. The third image 222 may be of the same scene as the first image 204 and second image 212, but from a different viewpoint. The user interface 202 may depict the ring 218 indicating the status of the depth information collection as complete. As such, the user interface 202 depicted in FIG. 2D may be displayed.

Figure 2D:
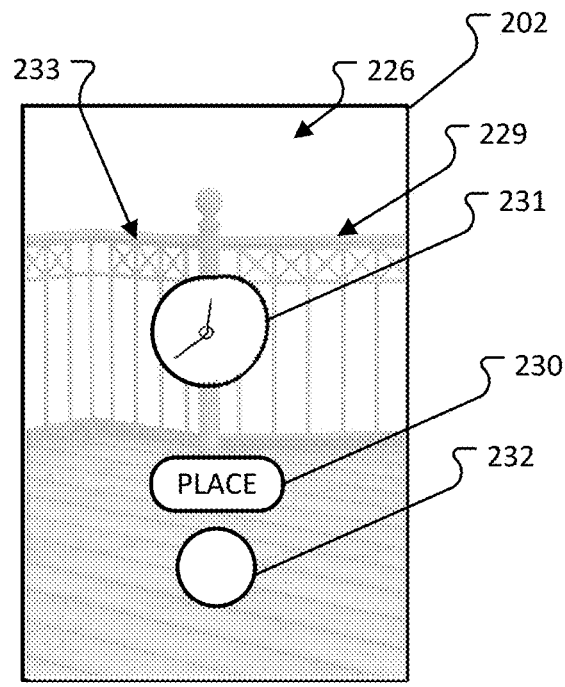

As depicted in FIG. 2D, the user interface 202 displayed at the computing device, such as the computing device 108 (FIG. 1) may depict a fourth image 226 as imaged by an image sensor of the computing device. The fourth image 226 may be of the same scene as the first image 204, second image 212, and third image 222, but from a different viewpoint. The user interface 202 may display the content selected in FIG. 2A or captured by the computing device in real time. For example, the content 231 may be displayed, where the content 231 may be indicative of a video or an image. The user interface 202 may further include a prompt 230 suggesting to the user to place the content 231. In example, the user may desire to place the content 231 on the corner of the first side of the railing 229 and the second side of the railing 233. Accordingly, the content 231 may be placed on two or more surfaces or planes depicted in the fourth image 226. As depicted in the user interface 202 of FIG. 2D, the content 231 appears to be projected onto two or more surfaces in the environment or world depicted in the fourth image 226. Once the user is satisfied with how the content 231 appears to be projected onto to the two or more surfaces, the user may select a control 232 to associate the content 231 with a coordinate location corresponding to a depicted location of the content 231. For example, the coordinate location may identify an X and Y coordinate based on an accelerometer or other position sensor together with an estimated depth provided by the depth information, e.g., a depth map. The depth map may also provide a Z coordinate. In addition to associating the content 231 with a coordinate location corresponding to the depicted location of the content 231, the depth information, e.g., a depth map utilized by the depicted content 231 may be saved and associated with the coordinate location and the content 231.

Figure 2E:
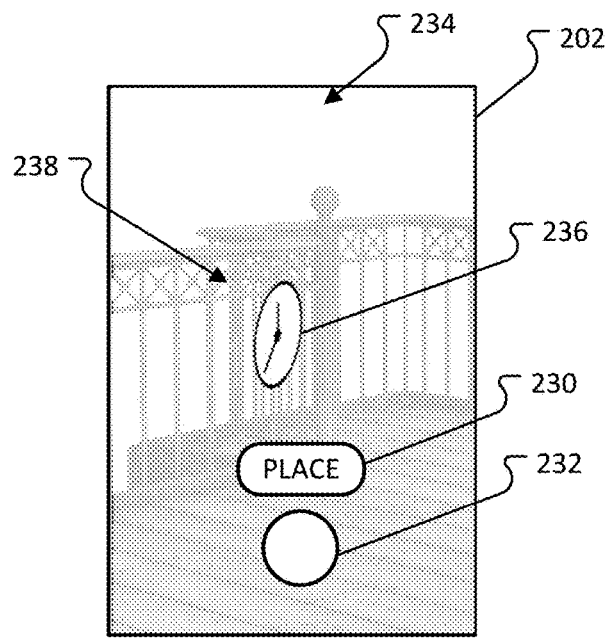

As depicted in FIG. 2E, the user interface 202 displayed at the computing device, such as the computing device 108 (FIG. 1) may depict a fifth image 234 as imaged by an image sensor of the computing device. The fifth image 234 may be of the same scene as the first image 204, second image 212, third image 222, and fourth image 226, but from a different viewpoint. In examples, the different viewpoint is due to the computing device being moved or otherwise adjusted to image a different view of a scene and/or a scene in close proximity or otherwise adjacent to a previous scene. The user interface 202 may display the content 236 selected in FIG. 2A or captured by the computing device in real time. That is, the user may desire to place another copy of the content selected in FIG. 2A or captured by the computing device in real time within the environment or world. Alternatively, or in addition, the content 236 may be content that is different from previously placed content 231. For example, the content 231 may display an image or video of a clock as first content while the content 236 may display a different image or video as second different content. The content 236 may be displayed in the fifth image 234, where the content 236 may be indicative of a video or an image. The user interface 202 may further include a prompt 230 suggesting to the user to place the content 236. In example, the user may desire to place the content 236 on the railing 238. Accordingly, the content 236 may be placed on a single surface or plane. Alternatively, or in addition, the railing 238 may be associated with varying depths such that the content 236 is placed on two or more surfaces or planes depicted in the fifth image 234. As depicted in the user interface 202 of FIG. 2E, the content 236 appears to be projected onto the railing in the environment or world depicted in the fifth image 234. Once the user is satisfied with how the content 236 appears to be projected into the environment or world, the user may select a control 232 to associate the content 236 with a coordinate location corresponding to a depicted location of the content 236. For example, the coordinate location may identify an X and Y coordinate based on an accelerometer or other position sensor together with an estimated depth provided by depth information, e.g., a depth map. The depth information, e.g., depth map, may also provide a Z coordinate. In addition to associating the content 236 with a coordinate location corresponding to the depicted location of the content 236, depth information, e.g., a depth map, utilized by the depicted content 236 may be saved and associated with the coordinate location and the content 236.

Figure 2F:
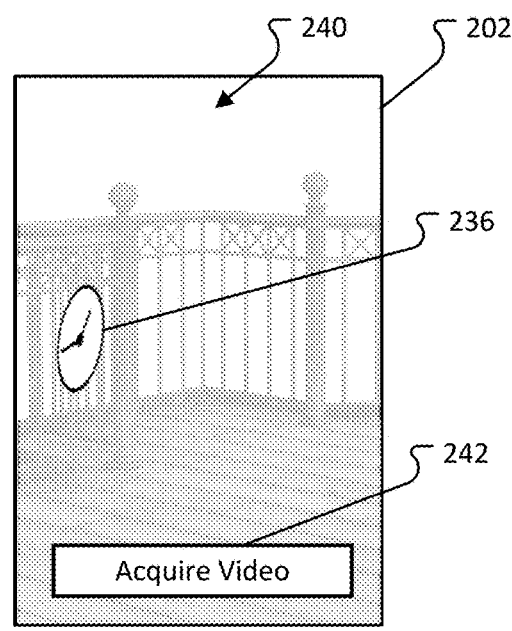
Figure 2G:
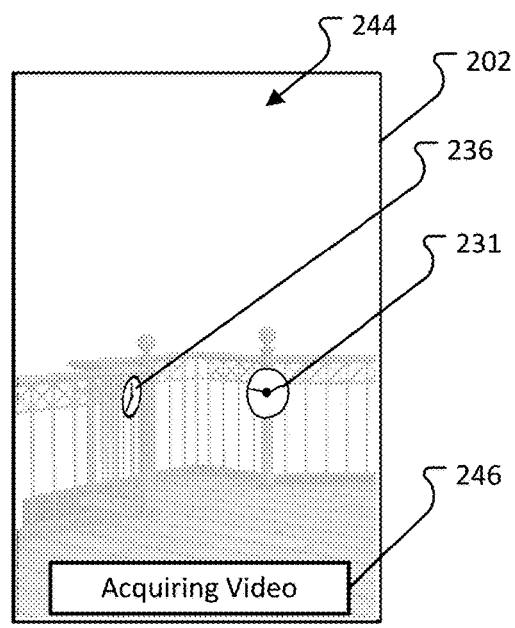

Once the content 236 has been placed into the user's world, the user interface 202 may then display a sixth image 240 as depicted in FIG. 2F, where the sixth image 240 may be of the same scene as the first image 204, second image 212, third image 222, fourth image 226, and fifth image 234, but from a different viewpoint and the sixth image 240 may depict the content 236 based on the associated coordinate location. For example, as the user moves the computing device and an image acquired from the computing device is displayed in the user interface 202, when the image acquired by the image sensor includes the coordinate location associated with the content 236, the content 236 may be displayed in the acquired image, such as the sixth image 240. The sixth image 240 may display one or more of the placed content 231/236 and prompt the user to start acquiring video with the prompt 242. Accordingly, upon acquiring video of the environment or world, the display of the computing device may output an augmented reality display depicting the content 231/236 as placed within the environment or world. For example, as depicted in FIG. 2G, the image 244 may depict the content 231 and the content 236 from an angle or location other than the original angle or location used to place the content 231 and 236 respectively. As depicted in the image 244 of FIG. 2G, a user may change location causing the computing device to image a different location—in such an instance, the content 236 and 231 may appear to be projected onto one or more surfaces of the environment when viewed from the different location. The user interface 202 may further indicate to a user that the computing device is acquiring video with the status message 246, which may be an icon, text, graphic, or other indication.

Figure 3A:
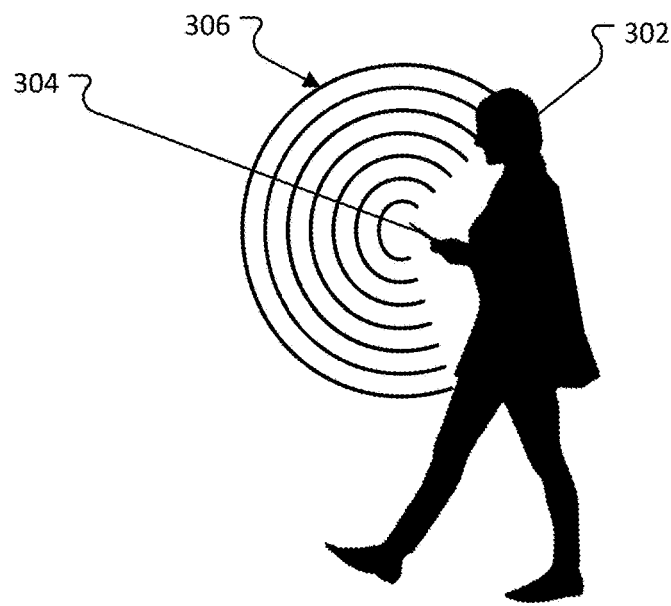
FIGS. 3A-3B depict details directed to the acquisition of depth information in accordance with examples of the present disclosure.
Figure 3B:
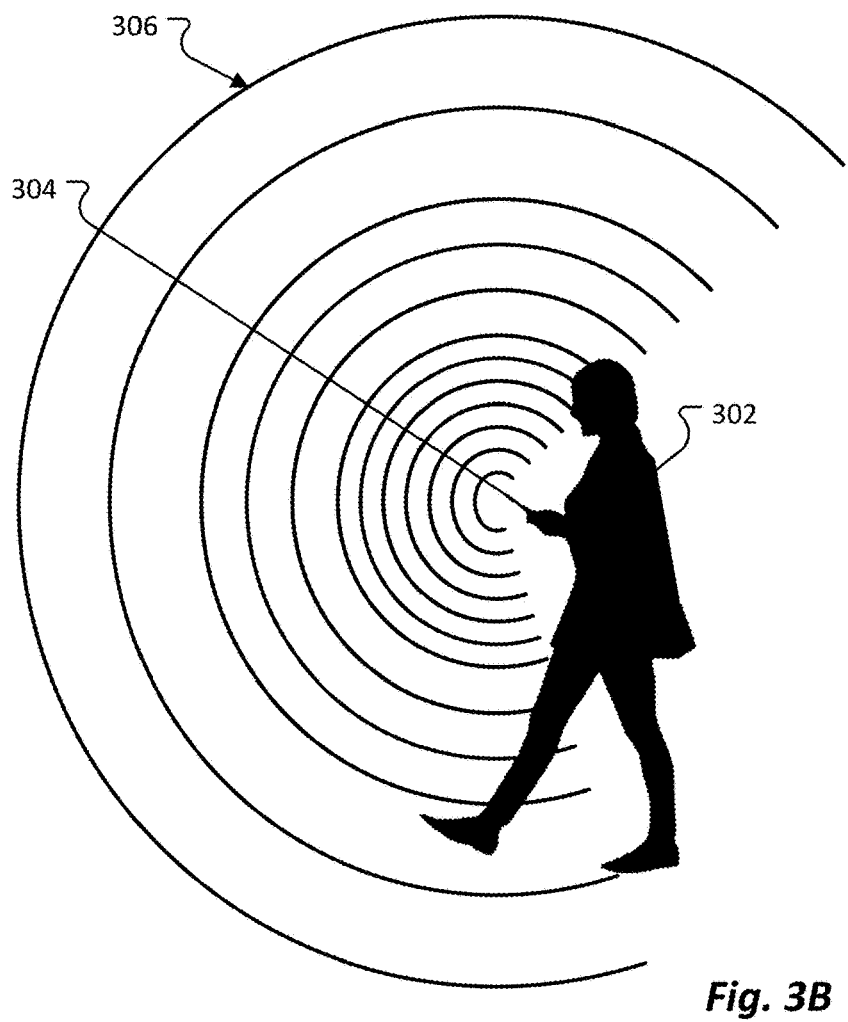

FIGS. 3A-3B depict details directed to the acquisition of depth information in accordance with examples of the present disclosure. More specifically, in FIG. 3A, a user 302 may move a computing device 304 around a little thereby acquiring fewer images than the user 302 in FIG. 3B. Accordingly, the depth information obtained by the computing device 304 in FIG. 3A is less than the depth information acquired by the computing device 304 in FIG. 3B. Accordingly, the more the user 302 moves the computing device around, the more images there are to be processed and therefore additional depth information of the environment 306 may be obtained. In examples, the images acquired by the computing device may be processed by a depth information generator which may be accessible by an application programming interface for example. The depth information generator may utilize multiple device images from different angles and compare them to generate an estimate of the distance to every pixel in the images as a user moves their computing device, e.g., phone. If the computing device has a supported hardware depth sensor, such as but not limited to a time-of-flight sensor, such data obtained from the supported hardware depth sensor may be included in the processed depth to enhance accuracy of the existing depth information, in addition to being directly used as the depth information. In some examples, the additional depth information of the environment 306 may be acquired from a mesh representation of a depth image, may be acquired from existing depth information previously acquired, or may be obtained based on a plurality of sensors, such as LiDAR, Structure Light, or other sensors.

Figure 4:
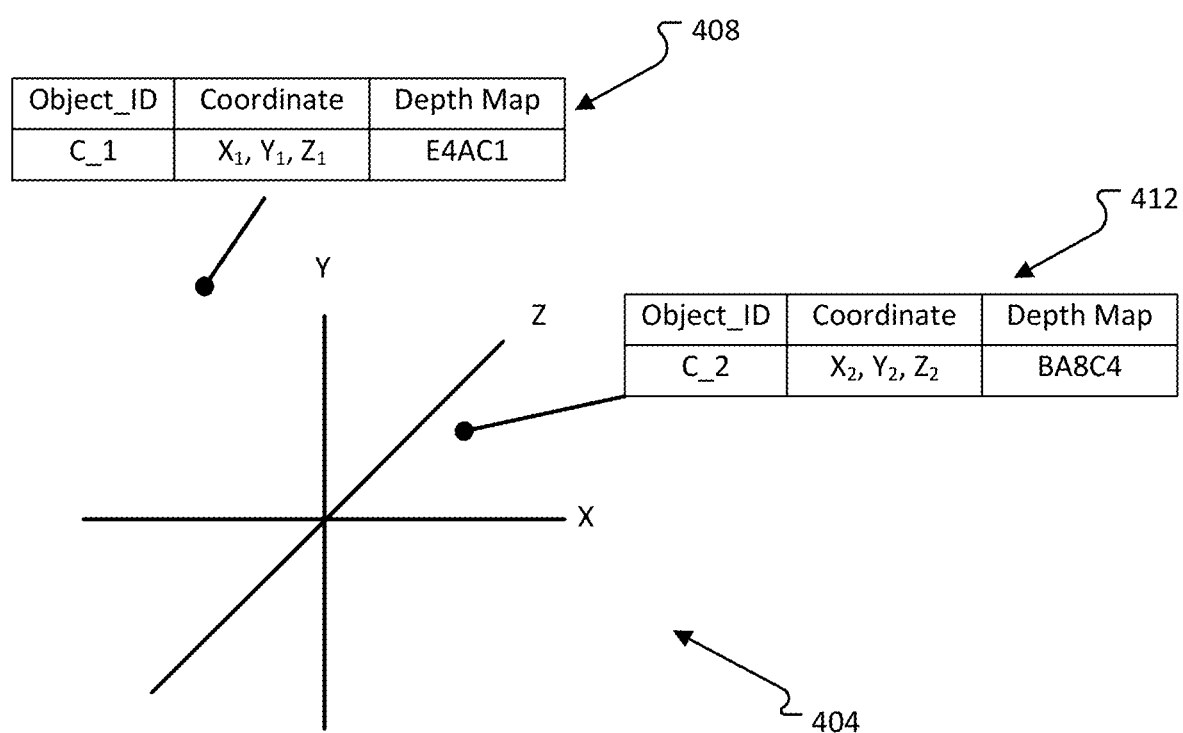
FIG. 4 depicts details directed to the placement of content in accordance with examples of the present disclosure.

FIG. 4 depicts details directed to the placement of content in accordance with examples of the present disclosure. More specifically, based on an acquired depth information, e.g., a depth map, coordinate locations within an environment or world may be obtained. As one example, an axis 404 having an origin established when a user selects or captures the content or when the user begins placing content is used to track X, Y movements as provided by an accelerometer or other position sensor of a computing device. Further, the axis 404 may track distance Z as provided by depth information, e.g., one or more depth maps. In examples, when a user places, moves, scales, or rotates content within the environment or world, the coordinate location, an object identifier uniquely identifying the content, and depth information, e.g., a depth map, used to place, move, scale, or rotate the content may be recorded in a data structure, such as the data structures 408 and 412. As depicted in the data structures, the content as identified by the object IDs are placed at different locations within an environment.

Figure 5A:
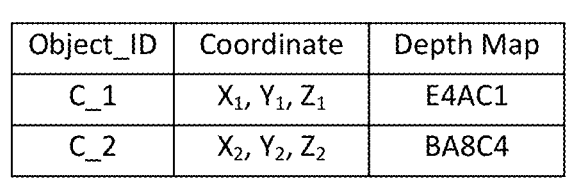
FIGS. 5A and 5B depict details of a data structure in accordance with examples of the present disclosure.
Figure 5B:
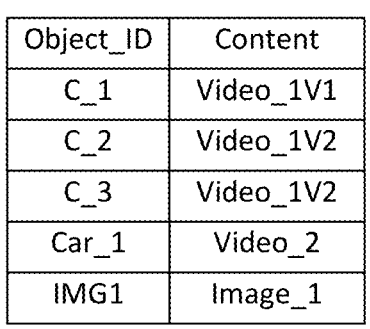

As depicted in FIG. 5A, the locations corresponding to the placed content may be stored in a data structure 504 in accordance with examples of the present disclosure. The data structure 504 may uniquely identify the content placed with the object ID field, a location at which the content is placed with the X, Y, Z coordinates, and the specific depth map used. As further depicted in FIG. 5B, each object ID may uniquely identify content or a version of the content. In examples, though a user may place the same content multiple times in the video, the start and stop times associated with the content (e.g., video content or image content) may vary. Accordingly, different versions of the content may be uniquely identified. For example, the data structure 508 may include an Object ID (e.g., C_1) corresponding to a first version of a video Video_1, and an Object ID (e.g., C_2) corresponding to a second version of the video Video_1. Further, the data structure 508 may include an Object ID (e.g., C_3) corresponding to the second version of the video Video_1. The second version of the video may be same as the first version of the video; however, the second version of the video may be different in some manner. As an example, the second version of the video may start at a different starting point, display at a different frame rate, and/or end at a different stopping point.

Figure 6:
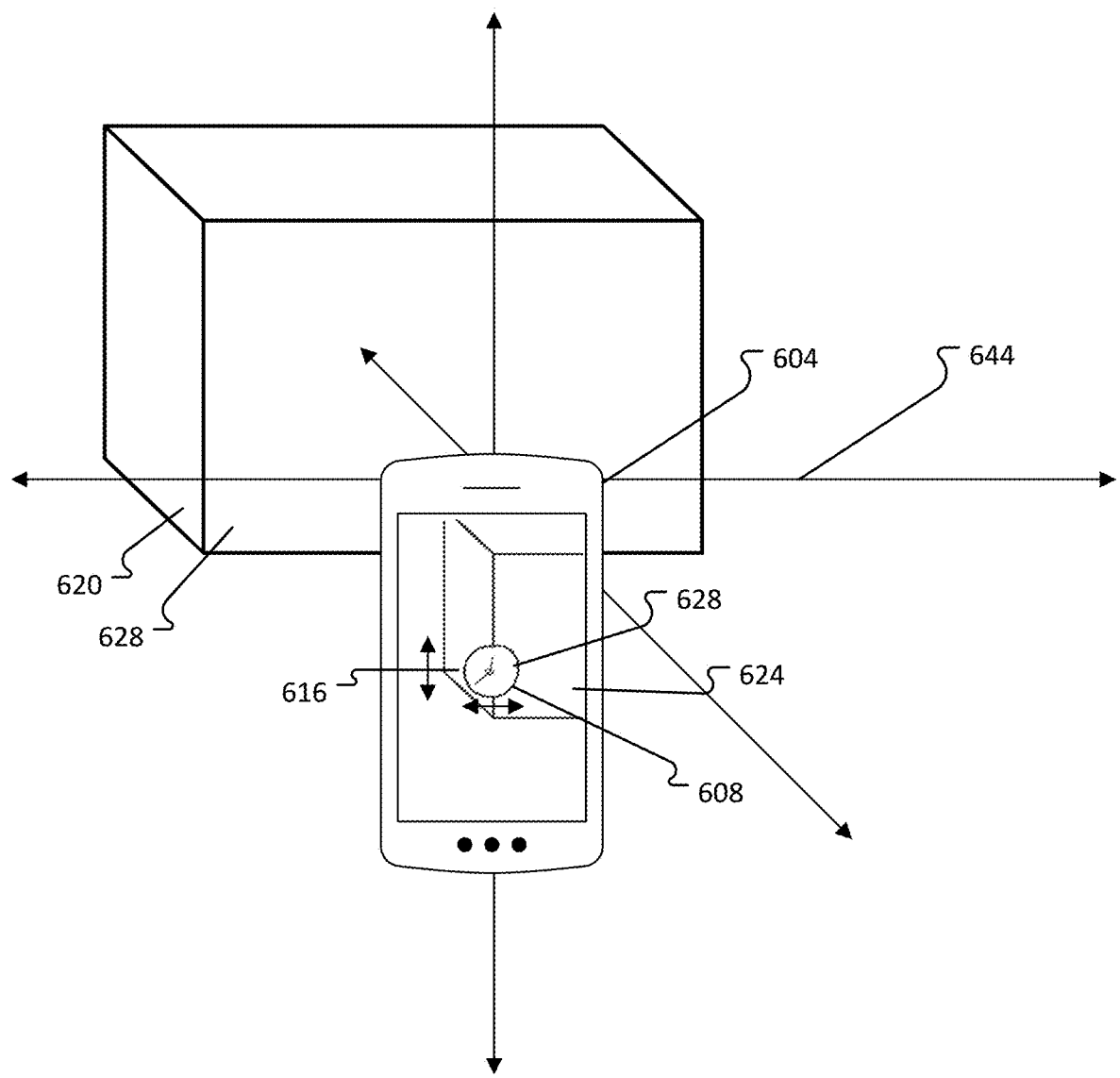
FIG. 6 depicts additional details directed to placing content in accordance with examples of the present disclosure.

FIG. 6 depicts additional details directed to placing content in accordance with examples of the present disclosure. More specifically, the placement of content 608 is achieved by combining depth information and positional tracking information. Instead of maintaining the form of the content, which may be a 3D representation, the content is warped as if it were a stretchy cloth or a projection. This projection effect is achieved by centering the content in the camera frustrum and moving the Z component of content's vertices along the camera's forward vector, where the camera may correspond to an image sensor associated with the computing device. The amount each vertex is moved is dependent on the current depth estimation for the closest pixel to the content's X and Y coordinate. Additionally, in some examples, a confidence score related to depth information is utilized, and a determination whether to project the content may be dependent on the confidence of the depth information. In one embodiment, if the confidence of the depth information is too low, e.g., the confidence is less than a threshold, the projection of content may be stopped and the content may be located in front of the camera floating in air. If the confidence of the depth information is greater that a threshold, the content 608 is placed in accordance with a location as selected by a user and projected accordingly.

As depicted in FIG. 6, a computing device 604 may display an image of an environment or world in accordance with examples of the present disclosure. A user may wish to place the content 608 on the corner of the surface 616 of the imaged surface 620 and 624 of the imaged surface 628. Accordingly, the user interface 636 may depict an example representation the content 608 placed at the corner formed by surfaces 620 and 628. When the user is satisfied with the look of the current projection, they may place the content in world space. At this point a copy of the projection is made by saving the position of the content in world space and the depth information at the time of placement. Once the projection is saved, a texture is added to the projection using the content 608. Because a flat plane is used as the initial content, the video content or image content may be stretched to match the plane's aspect ratio. A stretch to height method of may be applied to the content 608 when applying the content 608 to the plane.

In examples, one or more of three options may be selected to process the content 608: no processing, video matting, and chroma keying. Video and/or image matting separates the human or another object in a video or image from the background such that the video or image of the human or other object can be projected without the background. Chroma-keying uses color values of each pixel to determine if they match a common screening color. As for the chroma-keying process, first a boundary of the video or an image may be viewed to determine if there is a common background color throughout the video or image. The video or image may then be modified such that the background color as determined by a selected common background color is transparent. Example colors include red, green, blue, black, or white which may be selected as the common background color that can be transparent. For example, a user may select green in a video or image having a green background such that all content in the video or image having the green color is rendered transparent.

In some examples, the input of the camera may be acquired and projected back on to the user's world. This can be used to blend the user's uploaded or captured content (e.g., video or images) with the real world texture. Accordingly, the input image can be stretched directly onto the real world such that the input image creates a frozen in time view of the real world from a perspective that the user may not currently have.

Figure 7:
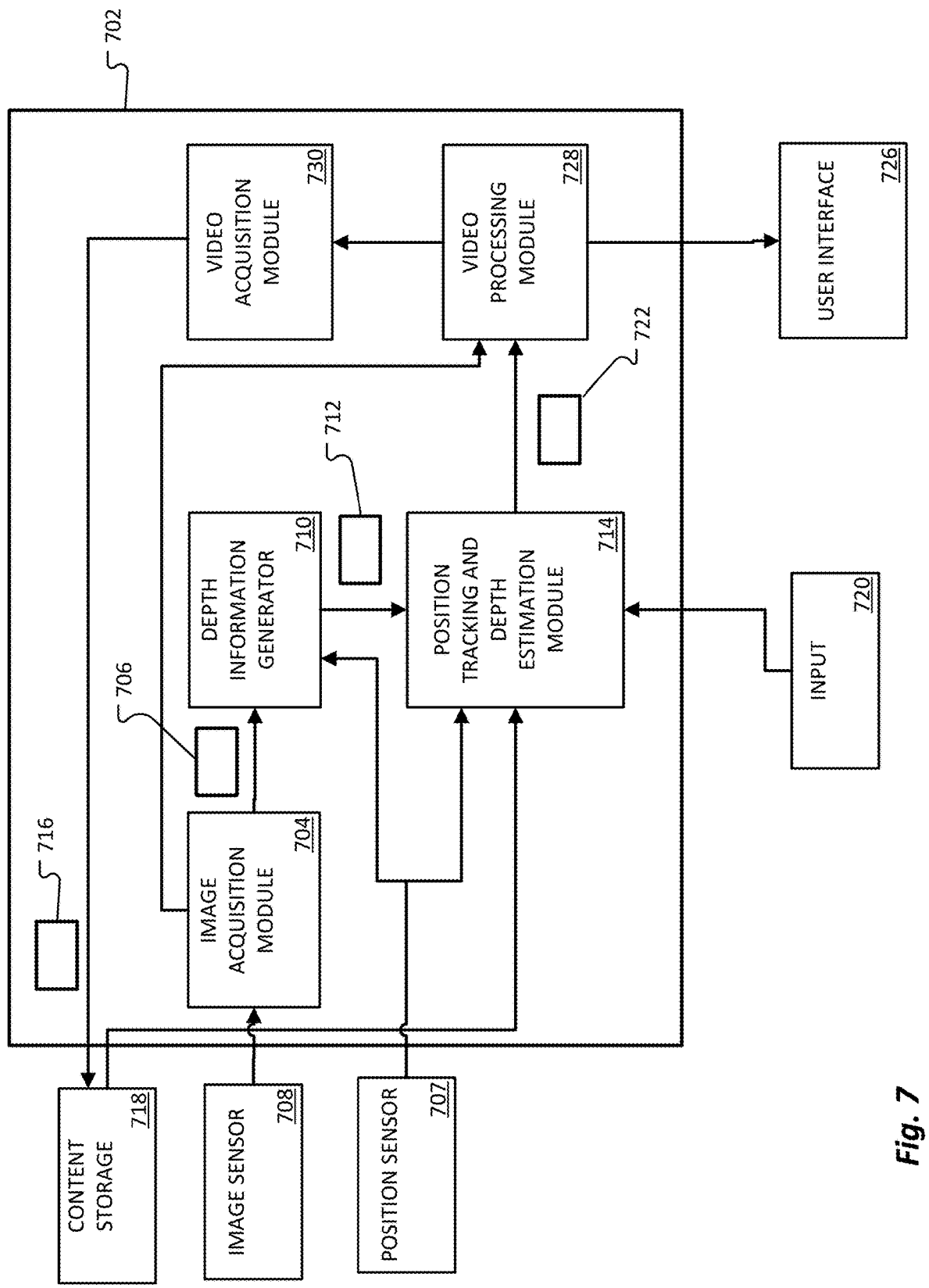
FIG. 7 depicts an example system in accordance with examples of the present disclosure.

FIG. 7 depicts an example system 700 in accordance with examples of the present disclosure. The system 700 may correspond to a system for placing content into a user's environment or world that can be imaged from an imaging device of a camera. In examples, a device 702 may include an image acquisition module 704 configured to acquire a plurality of images 706 of a user's environment. The plurality of images 706 may be acquired from an image sensor 708. The image sensor 708 may be incorporated within or otherwise included in a computing device, such as a computing device 108 (FIG. 1). In examples, the plurality of images 706 may be provided to the depth information generator 710. The depth information generator 710 may utilize multiple device images from different angles and compare them to generate an estimation of the distance to every pixel in the images as a user moves their computing device. If the computing device has a supported hardware depth sensor, such as but not limited to a time-of-flight sensor, such data may be included in the processed depth to enhance accuracy of an existing depth map. The depth information 712 may be provided to the position tracking and depth estimation module 714. In examples, the depth information 712 can include depth map that includes a depth image containing a distance representation at each pixel in the depth image.

The position tracking and depth estimation module 714 may receive content 716, and warp the content 716 as if the content were a stretchy cloth or a projection. In an example, if the content 716 is selected by the user, the content can be provided from content storage 718. This projection effect can be achieved by centering the content 716 in the camera frustrum and moving the Z component of the content 716 vertices along the camera's or image sensor's forward vector. The amount each vertex is moved is dependent on the current depth estimation for the closest pixel to the content's X and Y coordinates, where the X and Y coordinates may be based on positional information provided from a position sensor 707. In examples, the position tracking and depth estimation module 714 may receive user input 720 indicating a displayed projection is acceptable, which sends an instruction to place the content 716. Accordingly, a copy of the projection is made by saving the position of the content 716 in world space and the depth information at the time of placement as 722. In an example, a determination whether to project the content may be dependent on the confidence of the depth information. In one example, if the confidence of the depth information is too low, e.g., the confidence is less than a threshold, the projection of content may be stopped and the content may be located in front of the camera floating in air. If the confidence of the depth information is greater that a threshold, the content 716 is placed in accordance with a location as selected by a user and projected accordingly.

The video processing module 728 may texture the saved user projection with the content 716. For example, the projection may include depth information such that the depth information is textured with the content 716. The content 716 is stretched to match one or more plane's aspect ratio, where the one or more plane's may correspond to planes derived from distance information in the depth information 712. The video processing module 728 may then display an augmented reality image at a user interface 726 including the stretched content as placed within the user's environment. In examples, the video acquisition module 730 may obtain a plurality of images (e.g., video) or an image together with the placed content 716. The video acquisition module 730 may then provide the plurality of images (e.g., video) or an image together with the placed content 716 to the content storage 718 for storage, where the content storage may reside at the device 702 and/or external to the device 702.

Figure 8:
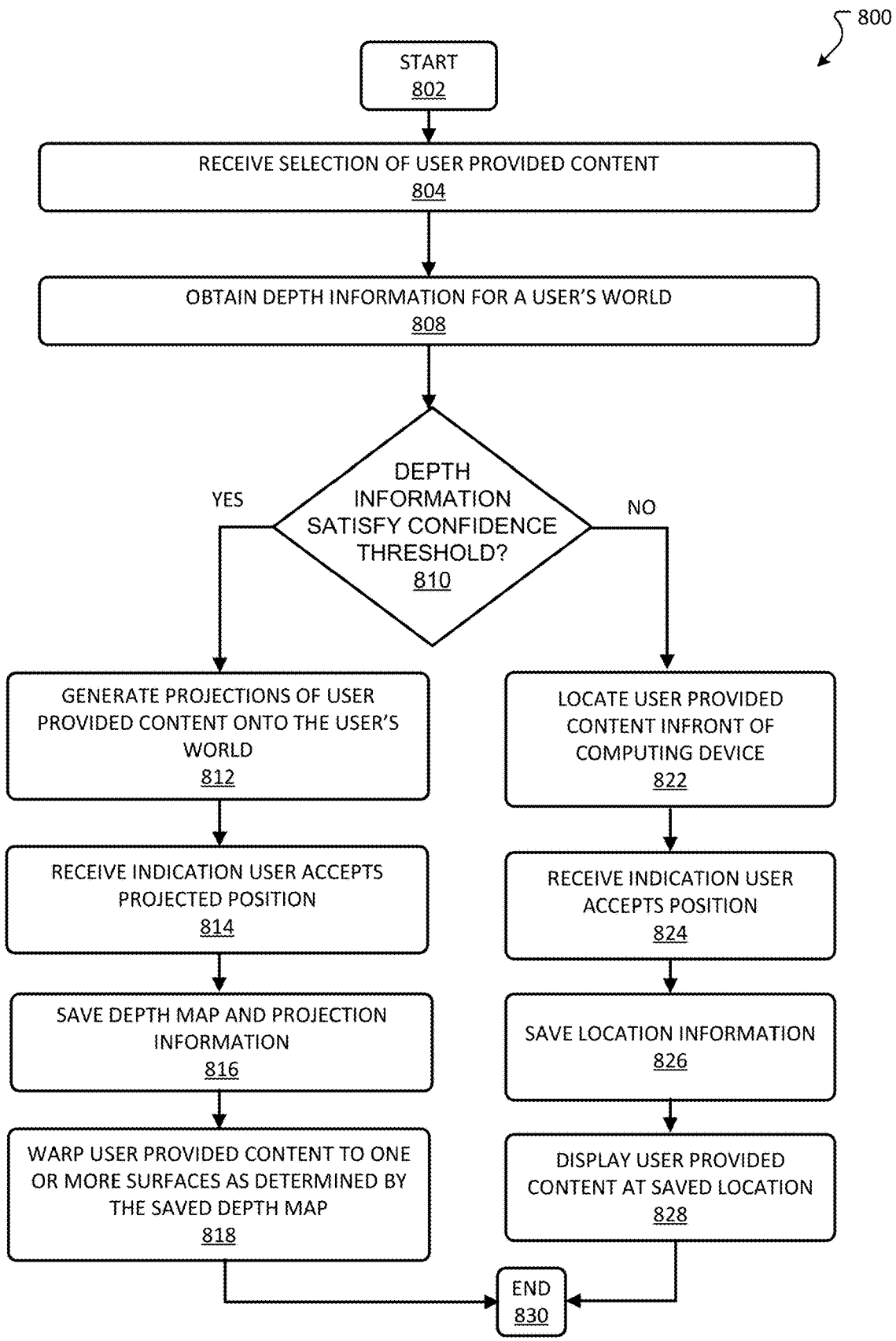
FIG. 8 depicts details of a method for placing content into a user's world in accordance with examples of the present disclosure.

FIG. 8 depicts details of a method 800 for placing content into a user's world in accordance with examples of the present disclosure. A general order for the steps of the method 800 is shown in FIG. 8. Generally, the method 800 starts at 802 and ends at 830. The method 800 may include more or fewer steps or may arrange the order of the steps differently than those shown in FIG. 8. The method 800 can be executed as a set of computer-executable instructions executed by a computer system and encoded or stored on a computer readable medium. In examples, aspects of the method 800 are performed by one or more processing devices, such as a computer. Further, the method 800 can be performed by gates or circuits associated with a processor, Application Specific Integrated Circuit (ASIC), a field programmable gate array (FPGA), a system on chip (SOC), a neural processing unit, or other hardware device. Hereinafter, the method 800 shall be explained with reference to the systems, components, modules, software, data structures, user interfaces, etc. described in conjunction with FIGS. 1-7.

The method starts at 802, where flow may proceed to 804. At 804, a content is received. For example, a user may select a video or an image in a camera roll of their computing device. In another example, the user may capture a video or image in real-time. In another example, the content can be selected from options provided by an application installed on the computing device executing the application. The method 800 may proceed to 808 where depth information associated with the user's world may be obtained. In examples, and as previously described, the depth information may be acquired from multiple images. That is, multiple device images from different angles may be acquired and compared to generate an estimate of the distance to every pixel in the images as a user moves their computing device. In another example, the depth information may be acquired from a supported hardware depth sensor, such as but not limited to a time-of-flight sensor, the depth information can be obtained from the supported hardware depth sensor. In addition, such data may be included in the processed depth to enhance accuracy of the existing depth information, e.g., depth map acquired from multiple images. At 810, a confidence threshold of the depth map information may be obtained. In examples, if the confidence of the depth map information is not greater than a threshold (e.g., the computing device is not confident the depth information is correct), the method may proceed to 822. Otherwise, the method proceeds to 812 where the content is projected on the user's world.

For example, at 812, the content is warped as if it were a stretchy cloth or a projection. This projection effect is achieved by centering the content in the camera's or image sensor's frustrum and moving the Z component of the content's vertices along the camera's forward vector. The amount each vertex is moved is dependent on the current depth estimation for the closest pixel to the content's X and Y coordinates, where the X and Y coordinates may be based on positional information provided from a position sensor. At 816, an indication may be received indicating that the user is satisfied with the projected position. Accordingly, at 816, a copy of the depth information and a copy of the content is saved. The method 800 may proceed to 818 where the content is applied to one or more surfaces as texture. For example, one or more surfaces (or planes) may be determined from the depth information; the portion of the content corresponding to the respective plane or surface may be warped based on the depth information. In examples, a user may optionally select one or more of video matting and/or chroma-keying to separate a human or another object in a video or image from the background or otherwise make the background transparent. Thus, just the human or object may be projected on the user's world.

In instances where the depth information does not satisfy a confidence interval, the content may be located in front of the computing device's camera at 822. Upon receiving an indication that the user accepts the position at 824, the location of the content may be saved at 826 such that the content is displayed as if the content is projected on a single plane or surface at 828 according the saved location information at 826. The method 800 may end at 830.

Figure 9:
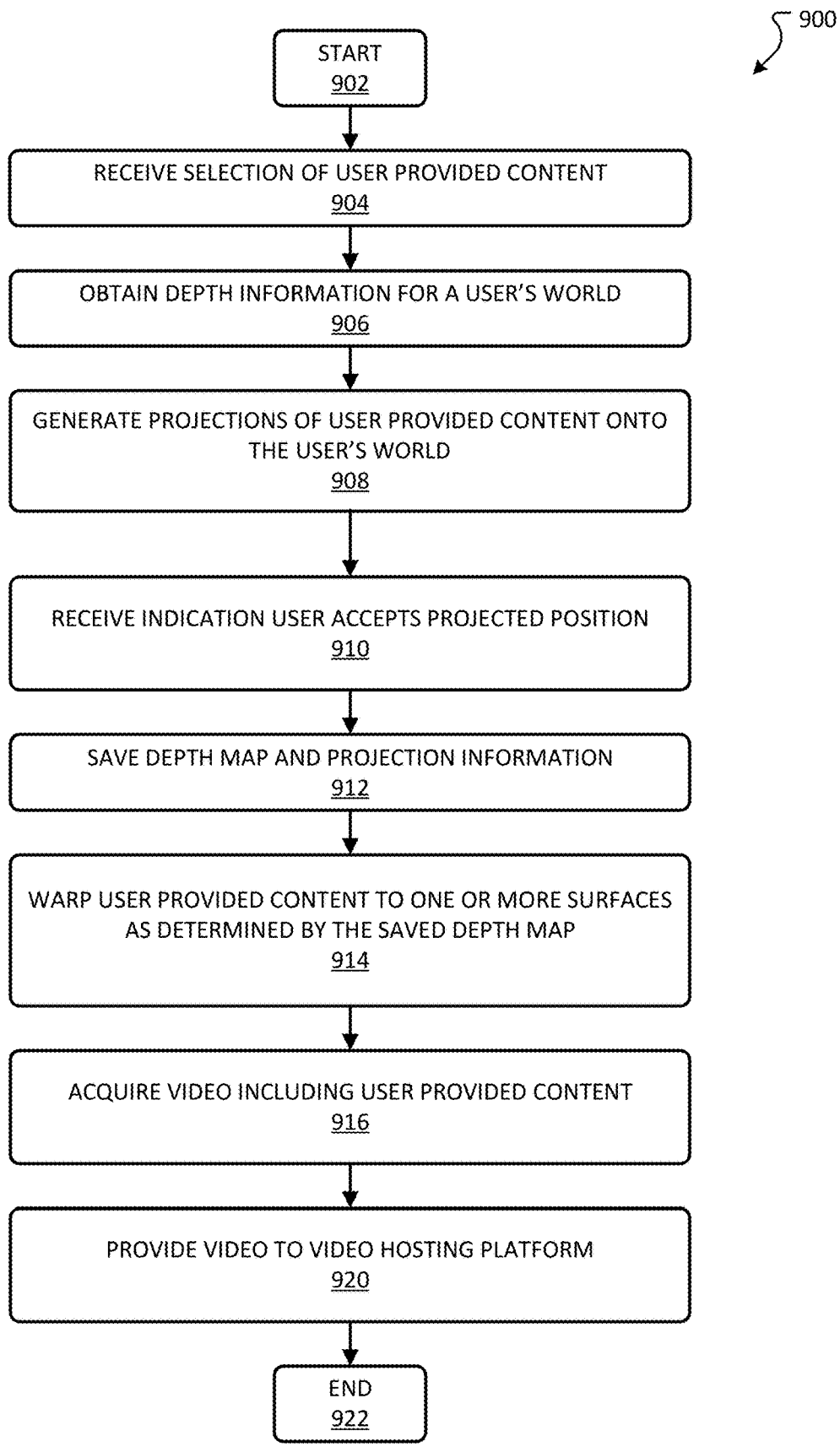
FIG. 9 depicts details of a method for placing content into a user's world and acquiring video in accordance with examples of the present disclosure.

FIG. 9 depicts details of a method 900 for placing content into a user's world and acquiring video in accordance with examples of the present disclosure. A general order for the steps of the method 900 is shown in FIG. 9. Generally, the method 900 starts at 902 and ends at 922. The method 900 may include more or fewer steps or may arrange the order of the steps differently than those shown in FIG. 9. The method 900 can be executed as a set of computer-executable instructions executed by a computer system and encoded or stored on a computer readable medium. In examples, aspects of the method 900 are performed by one or more processing devices, such as a computer. Further, the method 900 can be performed by gates or circuits associated with a processor, Application Specific Integrated Circuit (ASIC), a field programmable gate array (FPGA), a system on chip (SOC), a neural processing unit, or other hardware device. Hereinafter, the method 900 shall be explained with reference to the systems, components, modules, software, data structures, user interfaces, etc. described in conjunction with FIGS. 1-8.

The method starts at 902, where flow may proceed to 904. At 904, content is received. For example, a user may select a video or an image in a camera roll of their computing device. In another example, the user may capture a video or image in real-time. In another example, the content can be selected from options provided by an application installed on the computing device executing the application. The method may proceed to 906, where depth information associated with the user's world may be obtained. In examples, and as previously described, the depth information may be acquired from multiple images. That is, multiple images from different angles may be acquired and compared to generate an estimate of the distance to every pixel in the images as a user moves their computing device. In another example, the depth information may be acquired from a supported hardware depth sensor such as but not limited to a time-of-flight sensor, the depth information can be obtained from the supported hardware depth sensor. In addition, such data may be included in the processed depth to enhance accuracy of the existing depth information. At 908, the content is projected on the user's world.

For example, at 908, the content is warped as if it were a stretchy cloth or a projection. This projection effect can be achieved by centering the content in the camera frustrum and moving the Z component of the content's vertices along the camera's forward vector. The amount each vertex is moved is dependent on the current depth estimation for the closest pixel to the content's X and Y coordinates, where the X and Y coordinates may be based on positional information provided from a position sensor. In examples, a user may optionally select one or more of video matting and/or chroma-keying to separate a human or another object in a video or image from the background or otherwise make the background transparent. Thus, just the human or object may be projected on the user's world.

At 910, an indication may be received indicating that the user is satisfied with the projected position. Accordingly, at 912, a copy of the depth information, e.g. depth map, and a copy of the content is saved. The method 900 may proceed to 914 where the content is applied to one or more surfaces as texture. For example, one or more surfaces (or planes) may be determined from the depth information; the portion of the content corresponding to the respective plane or surface may be warped based on the depth information.

The method may proceed to 916 where video including the content as projected or placed into the user's world is obtained. For example, the computing device may obtain one or more images/videos depicting the content from different angles and/or locations. In examples, the acquired video is then provided to a video hosting platform for sharing at 920. The method 900 may end at 922.

Figure 10:
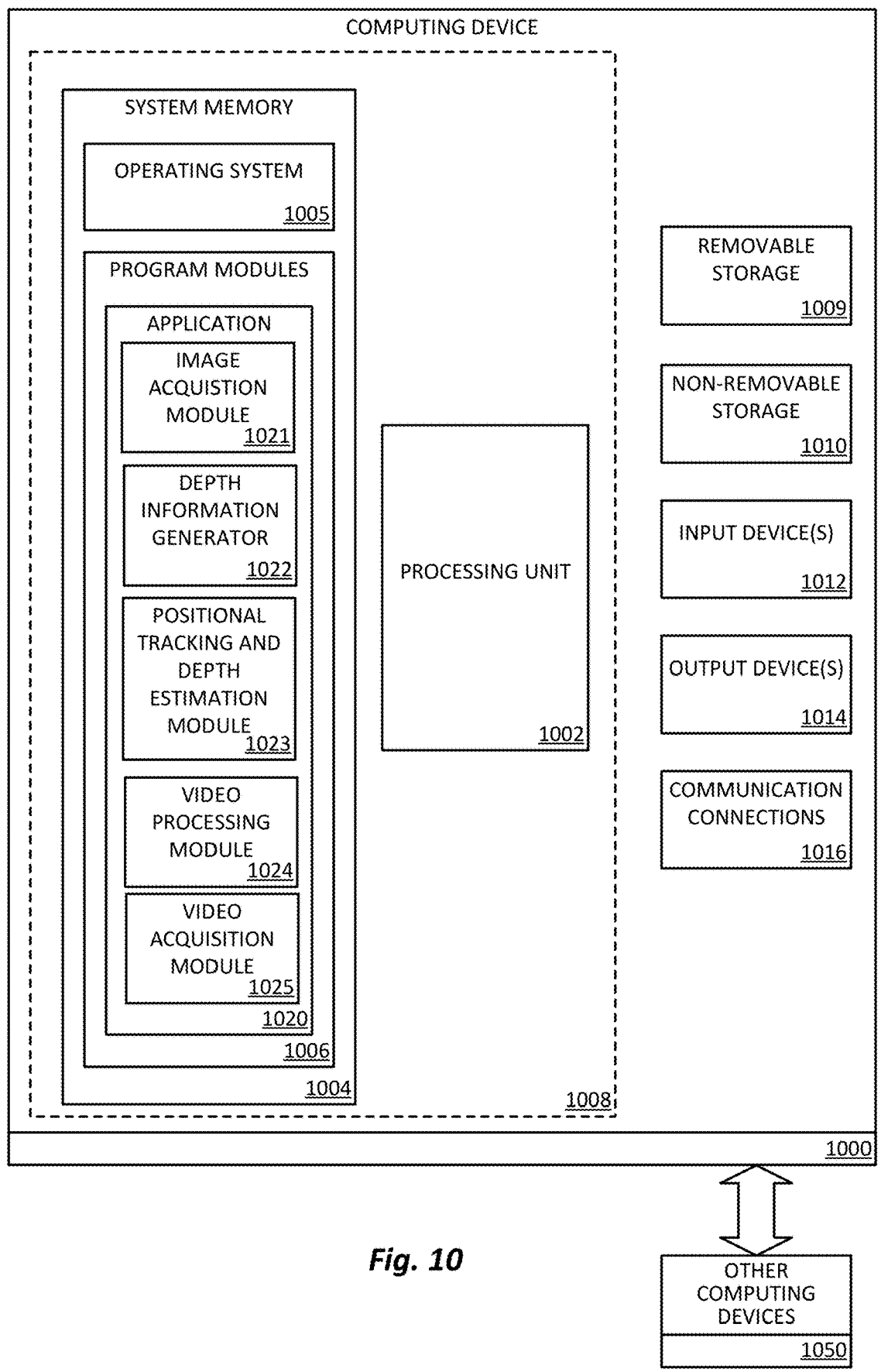
FIG. 10 is a block diagram illustrating physical components (e.g., hardware) of a computing device with which aspects of the disclosure may be practiced.

FIG. 10 is a block diagram illustrating physical components (e.g., hardware) of a computing device 1000 with which aspects of the disclosure may be practiced. The computing device components described below may be suitable for the computing and/or processing devices described above. In a basic configuration, the computing device 1000 may include at least one processing unit 1002 and a system memory 1004. Depending on the configuration and type of computing device, the system memory 1004 may comprise, but is not limited to, volatile storage (e.g., random-access memory (RAM)), non-volatile storage (e.g., read-only memory (ROM)), flash memory, or any combination of such memories.

The system memory 1004 may include an operating system 1005 and one or more program modules 1006 suitable for running software application 1020, such as one or more components supported by the systems described herein. As examples, system memory 1004 may include the image acquisition module 1021, the depth information generator 1022, the positional tracking and depth estimation module 1023, the video processing module 1024, and the video acquisition module 1025. The image acquisition module 1021 may be same as or similar to the image acquisition module 704; the depth information generator 1022 may be the same as or similar to the depth information generator 710, the position tracking and depth estimation module 1023 may be the same as or similar to the positional tracking and depth estimation module 714, the video processing module 1024 may be the same as or similar to the video processing module 728, and the video acquisition module 1025 may be the same as or similar to the video acquisition module 730. The operating system 1005, for example, may be suitable for controlling the operation of the computing device 1000.

Furthermore, embodiments of the disclosure may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the processing unit 1002, the program modules 1006 (e.g., software applications 1020) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided programs, etc.

Furthermore, embodiments of the disclosure may be practiced in an electrical circuit, discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality, all of which are integrated (or "burned") onto the chip substrate as a single integrated circuit. When operating via an SOC, the functionality, described herein, with respect to the capability of client to switch protocols may be operated via application-specific logic integrated with other components of the computing device 1000 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 1000 may also have one or more input device(s) 1012 such as a keyboard, a mouse, a pen, a sound or voice input device, a touch or swipe input device, etc. The one or more input device 1012 may include an image sensor. The output device(s) 1014 such as a display, speakers, a printer, etc. may also be included. The aforementioned devices are examples and others may be used. The computing device 1000 may include one or more communication connections 1016 allowing communications with other computing devices/systems 1050. Examples of suitable communication connections 1016 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable, and non-removable media implemented in any method or technology for storage of information, such as computer readable instructions, data structures, or program modules. The system memory 1004, the removable storage device 1009, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing system 1000. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 11A:
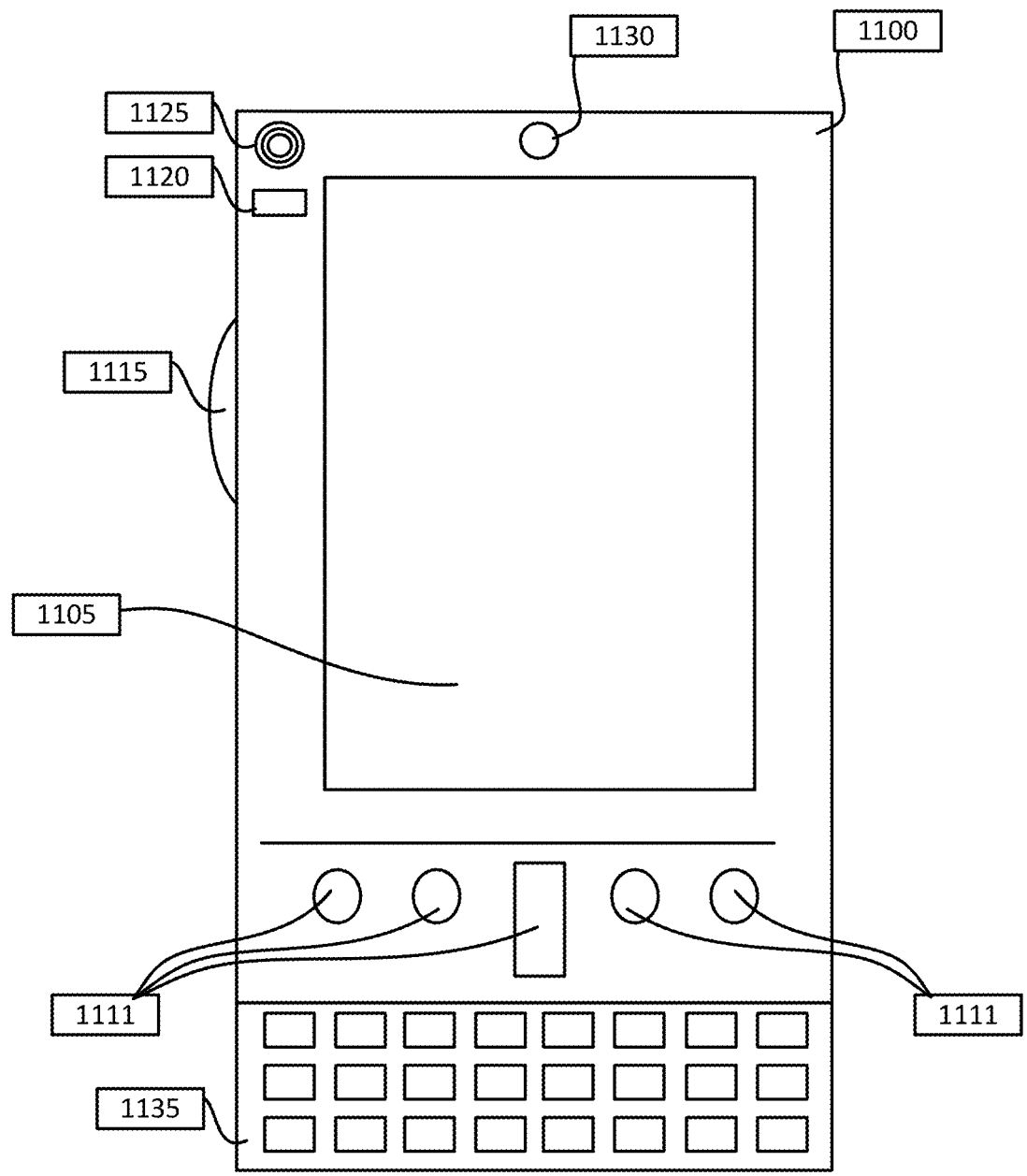
FIGS. 11A-11B illustrate a mobile computing device with which embodiments of the disclosure may be practiced.
Figure 11B:
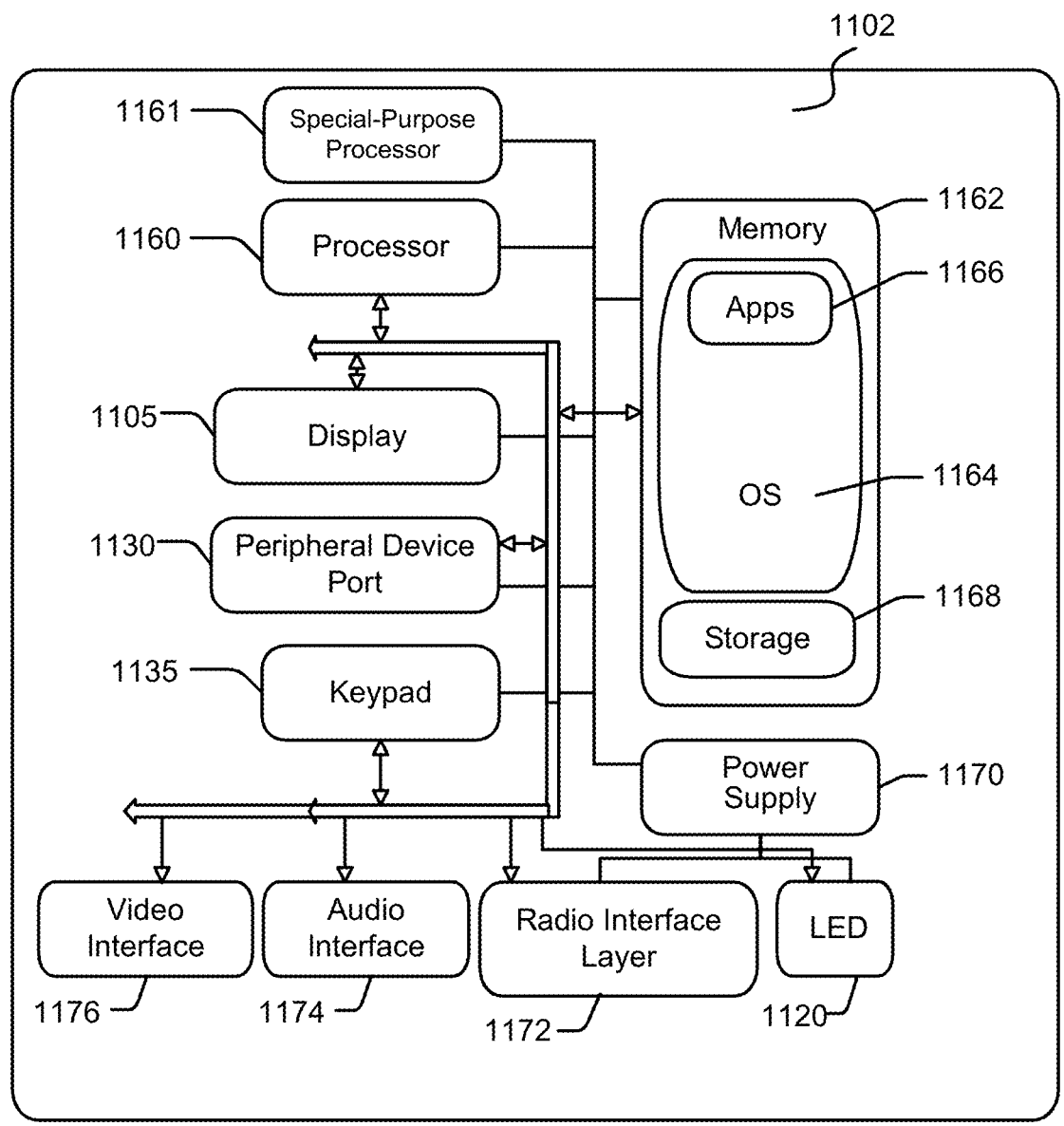

FIGS. 11A-11B illustrate a mobile computing device 1100, for example, a mobile telephone, a smart phone, wearable computer (such as a smart watch), a tablet computer, a laptop computer, smart home devices, and the like, with which embodiments of the disclosure may be practiced. In some examples, the mobile computing device 1100 may be the same as or similar to the computing device 108. In some respects, the client may be a mobile computing device. With reference to FIG. 11A, one aspect of a mobile computing device 1100 for implementing the aspects is illustrated. In a basic configuration, the mobile computing device 1100 is a handheld computer having both input elements and output elements. The mobile computing device 1100 typically includes a display 1105 and one or more input buttons 1110 that allow the user to enter information into the mobile computing device 1100. The display 1105 of the mobile computing device 1100 may also function as an input device (e.g., a touch screen display).

If included, an optional side input element 1115 allows further user input. The side input element 1115 may be a rotary switch, a button, or any other type of manual input element. In alternative aspects, mobile computing device 1100 may incorporate greater or fewer input elements. For example, the display 1105 may not be a touch screen in some embodiments.

In yet another alternative embodiment, the mobile computing device 1100 is a portable phone system, such as a cellular phone. The mobile computing device 1100 may also include an optional keypad 1135. Optional keypad 1135 may be a physical keypad or a "soft" keypad generated on the touch screen display.

In various embodiments, the output elements include the display 1105 for showing a graphical user interface (GUI), a visual indicator 1120 (e.g., a light emitting diode), and/or an audio transducer 1125 (e.g., a speaker). In some aspects, the mobile computing device 1100 incorporates a vibration transducer for providing the user with tactile feedback. In yet another aspect, the mobile computing device 1100 incorporates input and/or output ports, such as an audio input (e.g., a microphone jack), an audio output (e.g., a headphone jack), and a video output (e.g., a HDMI port) for sending signals to or receiving signals from an external device.

FIG. 11B is a block diagram illustrating the architecture of one aspect of a mobile computing device. That is, the mobile computing device 1100 can incorporate a system (e.g., an architecture) 1102 to implement some aspects. In one embodiment, the system 1102 is implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA), wireless phone, wearable devices, smart home devices, and the like.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, maps programs, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as e-mail or other messages used by an e-mail application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100 described herein.

The system 1102 has a power supply 1170, which may be implemented as one or more batteries. The power supply 1170 might further include an external power source, such as an AC adapter or a powered docking cradle that supplements or recharges the batteries.

The system 1102 may also include a radio interface layer 1172 that performs the function of transmitting and receiving radio frequency communications. The radio interface layer 1172 facilitates wireless connectivity between the system 1102 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1120 may be used to provide visual notifications, and/or an audio interface 1174 may be used for producing audible notifications via the audio transducer 1125. In the illustrated embodiment, the visual indicator 1120 is a light emitting diode (LED) and the audio transducer 1125 is a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1125, the audio interface 1174 may also be coupled to a microphone to receive audible input, such as to facilitate a telephone conversation. In accordance with embodiments of the present disclosure, the microphone may also serve as an audio sensor to facilitate control of notifications, as will be described below. The system 1102 may further include a video interface 1176 that enables an operation of an on-board camera 1130 to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11B by the non-volatile storage area 1168.

Data/information generated or captured by the mobile computing device 1100 and stored via the system 1102 may be stored locally on the mobile computing device 1100, as described above, or the data may be stored on any number of storage media that may be accessed by the device via the radio interface layer 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio interface layer 1172 or via a distributed computing network. Similarly, such data/information may be readily transferred between computing devices for storage and use according to well-known data/information transfer and storage means, including electronic mail and collaborative data/information sharing systems.

Figure 12:
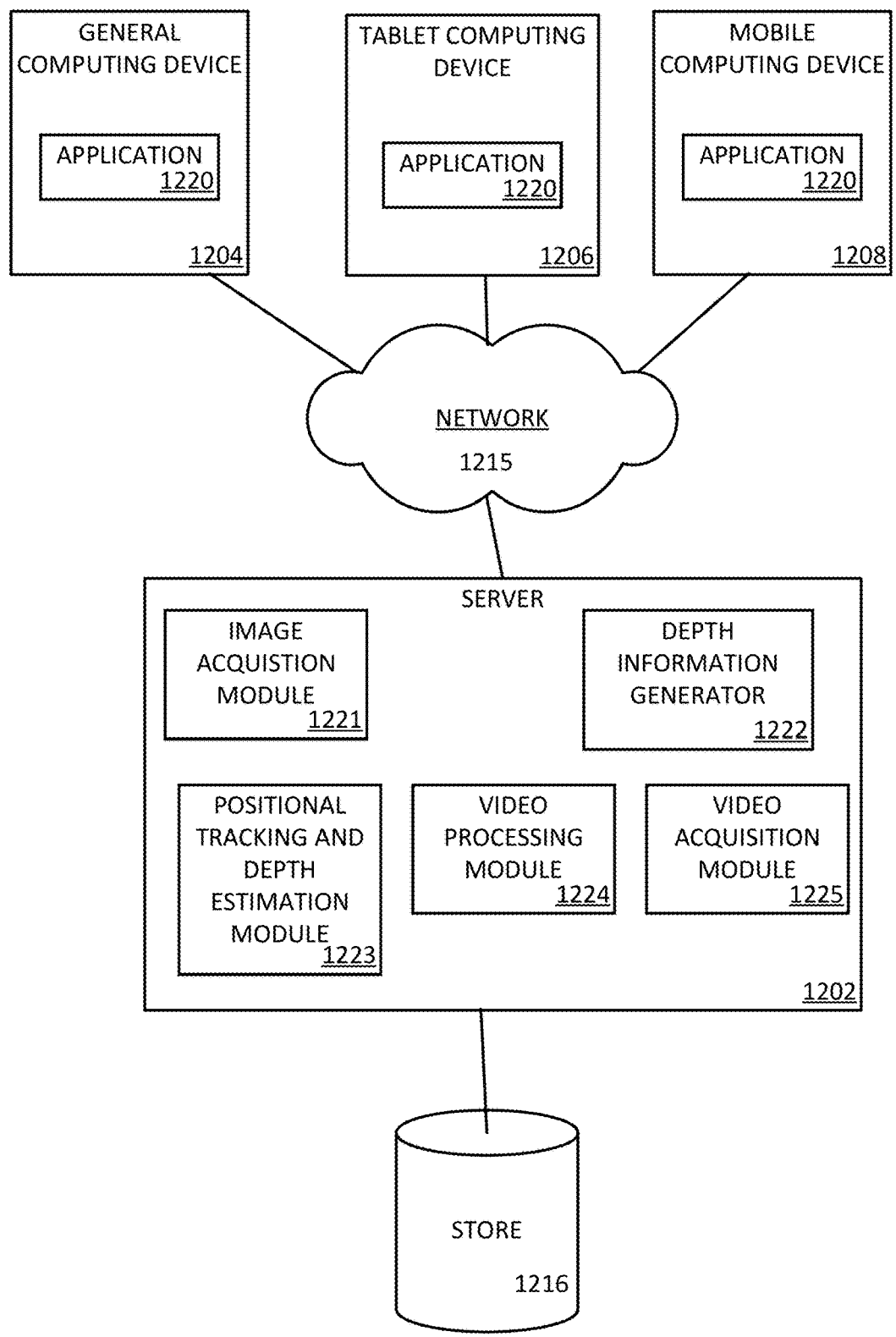
FIG. 12 illustrates one aspect of the architecture of a system for processing data.

FIG. 12 illustrates one aspect of the architecture of a system for processing data received at a computing system from a remote source, such as a personal computer 1204, tablet computing device 1106, or mobile computing device 1208, as described above. The personal computer 1204, tablet computing device 1206, or mobile computing device 1208 may include one or more applications; such applications may include but are not limited to the image acquisition module 1221, the depth information generator 1222, the positional tracking and depth estimation module 1223, the video processing module 1224, and the video acquisition module 1225. The image acquisition module 1221 may be same as or similar to the image acquisition module 704; the depth information generator 1222 may be the same as or similar to the depth information generator 710, the position tracking and depth estimation module 1223 may be the same as or similar to the positional tracking and depth estimation module 714, the video processing module 1224 may be the same as or similar to the video processing module 728, and the video acquisition module 1025 may be the same as or similar to the video acquisition module 730.

One or more of the previously described program modules 1006 or software applications 1020 may be employed by server device 1202 and/or the personal computer 1204, tablet computing device 1206, or mobile computing device 1208, as described above.

The server device 1202 may provide data to and from a client computing device such as a personal computer 1204, a tablet computing device 1206 and/or a mobile computing device 1208 (e.g., a smart phone) through a network 1215. By way of example, the computer system described above may be embodied in a personal computer 1204, a tablet computing device 1206 and/or a mobile computing device 1208 (e.g., a smart phone).

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The present disclosure relates to systems and methods for placing content into an imaged environment that is external to a computing device according to at least the examples provided in the sections below:

(A1) In one aspect, some examples include a method for placing content into an imaged environment that is external to a computing device. The method includes receiving content; obtaining depth information corresponding to the imaged environment external to the computing device; receiving an indication to associate the content with a location in the imaged environment based on the depth information; and warping at least a portion of the content based on the depth information corresponding to the imaged environment external to the computing device.

(A2) In some examples of A1, the method includes acquiring at least one of video or image content of the imaged environment external to the computing device, wherein the at least one of video or image content including the warped portion of the content.

(A3) In some examples of A1-A2, the method includes receiving second content; obtaining second depth information corresponding to the imaged environment external to the computing device; receiving a second indication to associate the second content with a second location in the imaged environment based on the second depth information; and warping at least a portion of the second content based on the second depth information corresponding to the imaged environment external to the computing device, wherein the at least one of video or image content of the imaged environment external to the computing device includes the warped portion of the content and the warped portion of the second content.

(A4) In some examples of A1-A3, the content comprises video content comprising a plurality of video frames, and wherein the plurality of video frames are displayed in the at least one of video or image content of the imaged environment external to the computing device.

(A5) In some examples of A1-A4, the depth information is obtained from a plurality of images acquired by an image sensor of the computing device.

(A6) In some examples of A1-A5, the method includes determining that the depth information corresponding to the imaged environment is associated with a confidence score that is greater than a threshold; and warping at least a portion of the content to match at least one plane in the imaged environment.

(A7) In some examples of A1-A7, the method includes determining that the depth information corresponding to the imaged environment is associated with a confidence score that is less than a threshold; and displaying the content at the location in the imaged environment.

(A8) In some examples of A1-A7, the method includes receiving second content in response to input information; obtaining second depth information corresponding to the imaged environment external to the computing device; determining that the second depth information corresponding to the imaged environment is associated with a confidence score that is less than a threshold; receiving a second indication to associate the second content with a second location in the imaged environment based on the second depth information; and displaying the second content at the second location in the imaged environment.

(A9) In some examples of A1-A8, the method includes determining that the second depth information corresponding to the imaged environment is associated with a confidence score that is greater than a threshold; receiving the second indication to associate the second content with a second location in the imaged environment based on the second depth information; and warping at least a portion of the second content to match at least one plane in the imaged environment.

(A10) In some examples of A1-A9, a background color of a portion of the content is modified prior to being warped.

(A11) In some examples of A1-A10, the method includes modifying the content by separating an entity in the content from a background of the content or modifying a background color of a portion of the content prior to the content being warped.

(A12) In some examples of A1-A11, he depth information includes a depth map image, the method further comprising: saving the depth map image from the depth information when the indication to associate the content with the location in the imaged environment is received.

In yet another aspect, some examples include a computing system including one or more processors and memory coupled to the one or more processors, the memory storing one or more instructions which when executed by the one or more processors, causes the one or more processors perform any of the methods described herein (e.g., A1-A12 described above).

In yet another aspect, some examples include a non-transitory computer-readable storage medium storing one or more programs for execution by one or more processors of a storage device, the one or more programs including instructions for performing any of the methods described herein (e.g., A1-A12 described above).

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for placing content into an imaged environment that is external to a computing device, the method comprising:
   receiving content;
   obtaining depth information corresponding to the imaged environment external to the computing device;
   receiving an indication to associate the content with a location in the imaged environment based on the depth information; and
   warping at least a portion of the content based on the depth information corresponding to the imaged environment external to the computing device.

2. The method of claim 1, further comprising:
   acquiring at least one of video or image content of the imaged environment external to the computing device, wherein the at least one of video or image content including the warped portion of the content.

3. The method of claim 2, further comprising:
   receiving second content;
   obtaining second depth information corresponding to the imaged environment external to the computing device;
   receiving a second indication to associate the second content with a second location in the imaged environment based on the second depth information; and
   warping at least a portion of the second content based on the second depth information corresponding to the imaged environment external to the computing device,
   wherein the at least one of video or image content of the imaged environment external to the computing device includes the warped portion of the content and the warped portion of the second content.

4. The method of claim 2, wherein the content comprises video content comprising a plurality of video frames, and wherein the plurality of video frames are displayed in the at least one of video or image content of the imaged environment external to the computing device.

5. The method of claim 1, wherein the depth information is obtained from a plurality of images acquired by an image sensor of the computing device.

6. The method of claim 1, further comprising:
   determining that the depth information corresponding to the imaged environment is associated with a confidence score that is greater than a threshold; and
   warping at least a portion of the content to match at least one plane in the imaged environment.

7. The method of claim 1, further comprising:
   determining that the depth information corresponding to the imaged environment is associated with a confidence score that is less than a threshold; and
   displaying the content at the location in the imaged environment.

8. The method of claim 1, further comprising:
   receiving second content in response to input information;
   obtaining second depth information corresponding to the imaged environment external to the computing device;
   determining that the second depth information corresponding to the imaged environment is associated with a confidence score that is less than a threshold;
   receiving a second indication to associate the second content with a second location in the imaged environment based on the second depth information; and
   displaying the second content at the second location in the imaged environment.

9. The method of claim 8, further comprising:
   determining that the second depth information corresponding to the imaged environment is associated with a confidence score that is greater than a threshold;
   receiving the second indication to associate the second content with a second location in the imaged environment based on the second depth information; and
   warping at least a portion of the second content to match at least one plane in the imaged environment.

10. The method of claim 1, further comprising:
    modifying the content by separating an entity in the content from a background of the content or modifying a background color of a portion of the content prior to the content being warped.

11. The method of claim 1, wherein the depth information includes a depth map image, the method further comprising:
    saving the depth map image from the depth information when the indication to associate the content with the location in the imaged environment is received.

12. A system configured to place content into an imaged environment that is external to a computing device, the system comprising:
    a processor; and
    memory including instructions, which when executed by the processor, causes the processor to:
       receive content;
       obtain depth information corresponding to the imaged environment external to the computing device;
       receive an indication to associate the content with a location in the imaged environment based on the depth information; and
       warp at least a portion of the content based on the depth information corresponding to the imaged environment external to the computing device.

13. The system of claim 12, wherein the instructions, when executed by the processor, cause the processor to:
    acquire at least one of video or image content of the imaged environment external to the computing device, wherein the at least one of video or image content including the warped portion of the content.

14. The system of claim 13, wherein the instructions, when executed by the processor, cause the processor to:
    receive second content;
    obtain second depth information corresponding to the imaged environment external to the computing device;
    receive a second indication to associate the second content with a second location in the imaged environment based on the second depth information; and
    warp at least a portion of the second content based on the second depth information corresponding to the imaged environment external to the computing device,
    wherein the at least one of video or image content of the imaged environment external to the computing device includes the warped portion of the content and the warped portion of the second content.

15. The system of claim 13, wherein the content comprises video content comprising a plurality of video frames and wherein the plurality of video frames are displayed in the at least one of video or image content of the imaged environment that is external to the computing device.

16. The system of claim 12, wherein the instructions, when executed by the processor, cause the processor to save the depth information corresponding to when the indication to associate the content with the location in the imaged environment is received.

17. A computer-readable storage medium including instructions, which when executed by a processor, cause the processor to:

receive content;

obtain depth information corresponding to an imaged environment that is external to a computing device;

receive an indication to associate the content with a location in the imaged environment based on the depth information; and warp at least a portion of the content based on the depth information corresponding to the imaged environment external to the computing device.

18. The computer-readable storage medium of claim 17, wherein the instructions, which when executed by a processor, cause the processor to:

acquire at least one of video or image content of the imaged environment that is external to the computing device, wherein the at least one of video or image content including the warped portion of the content.

19. The computer-readable storage medium of claim 18, wherein the instructions, which when executed by a processor, cause the processor to:

receive second content;

obtain second depth information corresponding to the imaged environment external to the computing device;

receive a second indication to associate the second content with a second location in the imaged environment based on the second depth information; and warp at least a portion of the second content based on the second depth information corresponding to the imaged environment external to the computing device, wherein the at least one of video or image content of the imaged environment external to the computing device includes the warped portion of the content and the warped portion of the second content.

20. The computer-readable storage medium of claim 17, wherein the content comprises video content comprising a plurality of video frames, and wherein the plurality of video frames are displayed in the at least one of video or image content of the imaged environment that is external to the computing device.

* * * * *